Aug. 5, 1958    H. L. MOUSSETTE    2,845,692
FISH HOOK SHARPENER
Filed Aug. 2, 1957    2 Sheets-Sheet 1
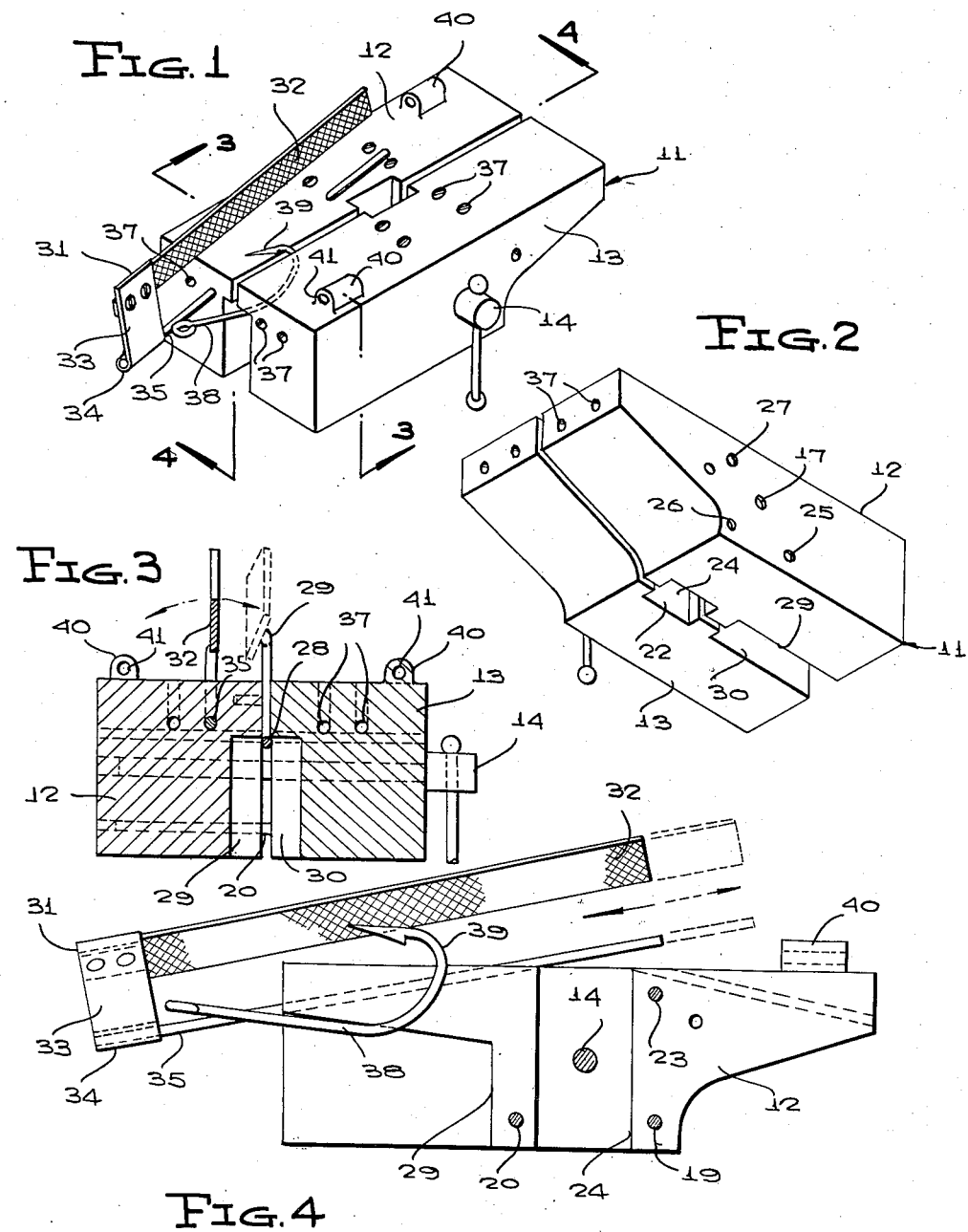
INVENTOR.
HENRY L. MOUSSETTE
BY
McMorrow, Berman & Davidson
ATTORNEYS Aug. 5, 1958     H. L. MOUSSETTE     2,845,692
FISH HOOK SHARPENER
Filed Aug. 2, 1957     2 Sheets-Sheet 2
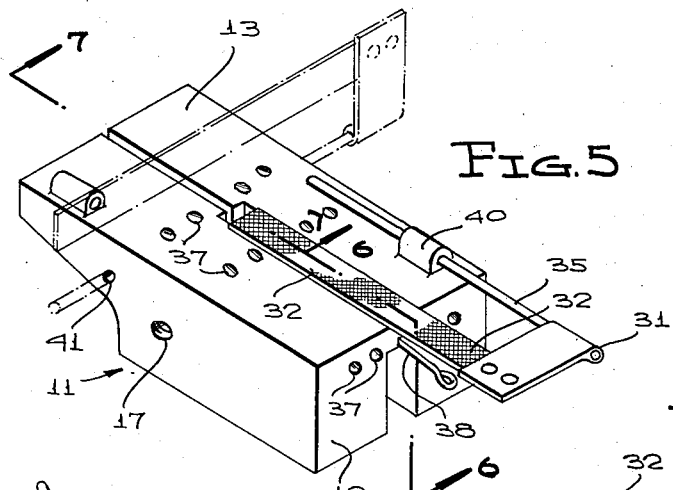
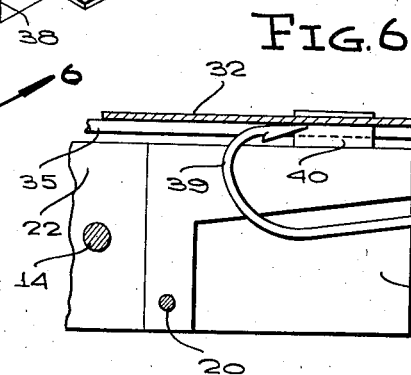
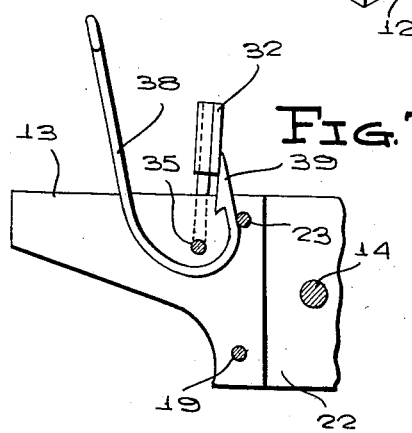
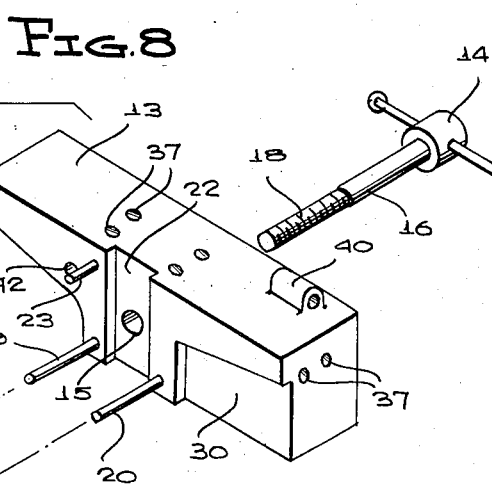
INVENTOR.
HENRY L. MOUSSETTE
BY
McMorrow, Berman & Davidson
ATTORNEYS United States Patent Office 2,845,692
Patented Aug. 5, 1958

2,845,692
FISH HOOK SHARPENER
Henry Lionel Moussette, Laconia, N. H.
Application August 2, 1957, Serial No. 675,869
5 Claims. (Cl. 29—76)

This invention relates to fish hook sharpening devices, and more particularly to a portable fish hook sharpener adapted to be carried in a fisherman's pocket or in any other suitable portable receptacle and adapted to be manually employed in any location.

A main object of the invention is to provide a novel and improved fish hook sharpener which is simple in construction, which is easy to set up for use, and which enables a fish hook to be accurately sharpened with a minimum amount of effort and in a relatively short period of time.

A further object of the invention is to provide an improved fish hook sharpener which is inexpensive to manufacture, which is durable in construction, which is easy to manipulate, and which is provided with means for sharpening any desired portion of a fish hook accurately and with a minimum amount of labor.

Further objects and advantages of the invention will become apparent from the following description and claims, and from the accompanying drawings, wherein:

Figure 1 is a perspective view of an improved fish hook sharpener constructed in accordance with the present invention.

Figure 2 is a perspective view of the fish hook sharpener of Figure 1 taken from below and from the side opposite of the point of view of Figure 1.

Figure 3 is an enlarged transverse vertical cross-sectional view taken on the line 3—3 of Figure 1.

Figure 4 is an enlarged longitudinal vertical cross-sectional view taken on the line 4—4 of Figure 1.

Figure 5 is a perspective view showing the fish hook sharpener of Figures 1 to 4 with the abrading member installed for longitudinal movement on the point of a fish hook clamped between the vise blocks of the sharpener.

Figure 6 is an enlarged longitudinal vertical cross-sectional view taken on the line 6—6 of Figure 5.

Figure 7 is a cross-sectional view taken on the line 7—7 of Figure 5 and illustrating the manner in which a fish hook may be engaged between the forward end portions of the vise blocks of the device and supported with its barb in an upstanding position so that it may be engaged by the abrading member of the sharpener mounted for transverse movement.

Figure 8 is a perspective view of the vise block element of the fish hook sharpener and of the clamping screw employed therewith, the parts being shown in separated positions.

Referring to the drawings, the improved fish hook sharpener is generally designated at 11 and comprises a pair of side by side vise blocks 12, 13, said blocks being arranged in side by side positions and being held together by a transverse clamping screw 14 which extends rotatably through the vise block 13 and which is threadedly engaged in the vise block 12, the block 13 being provided with the transverse bore 15 to rotatably receive the cylindrical shank portion 16 of the screw 14, and the vise block 12 being provided with the threaded bore 17 to threadedly receive the externally threaded end portion 18 of screw 14, as shown in Figure 8.

Secured to the intermediate portion of the vise block 13 and projecting perpendicular to its inside surface are a pair of relatively long guide pins 19 and 20, said guide pins being located at the lower portion of the block 13 on the opposite sides of a vertical groove 22 formed in said block, and a relatively short guide pin 23 located at the upper portion of the block 13 above the guide pin 19.

The vise block 12 is formed with a vertical groove 24 adapted to oppose the vertical groove 22 when the vise blocks are fastened together by the clamping screw 14, the lower portion of the vise block 12 being formed on opposite sides of the groove 24 with the transversely extending bores 25 and 26 adapted to slidably receive the relatively long guide pins 20 and 19, respectively. The upper portion of vise block 12 is formed above the guide bore 26 with a guide bore 27 adapted to slidably receive the relatively short guide pin 23.

As is clearly shown in Figure 8, the vise blocks 12 and 13 are recessed at their lower end portions, as shown at 29 and 30 for a purpose presently to be explained.

Designated generally at 31 is an abrading member which comprises a file 32, or similar elongated straight abrading bar which is secured at one end to a supporting plate 33, said supporting plate being formed with a socket or loop 34 extending parallel to the bar 32 in which is rigidly secured the end portion of a guide rod 35 which is thus rigidly held parallel to the abrading bar 32 and spaced therefrom.

The vise blocks 12 and 13 are formed with a plurality of generally longitudinally extending, inclined bores 37 adapted to slidably receive the guide bar 35, whereby the abrading member 31 may be slidably engaged with either of the guide blocks in a plurality of positions relative to a fish hook clamped between the vise blocks, for example, the fish hook 38 shown in Figure 1. When the abrading member 31 is thus supported, it is not only slidable in the selected bore 37, but is also rotatable in said bore, whereby it may be rotated to engage a portion of the point 39 of the fish hook at a desired angle with respect thereto.

The vise blocks are formed on their top surfaces with a pair of longitudinally extending upstanding rib elements 40 which are formed with longitudinally extending bores 41 adapted to slidably receive the guide rod 35, whereby to support the abrading member 31 for longitudinal reciprocation on either of the vise blocks so that the file bar 32 may be engaged with a top surface portion of a fish hook 39 in the manner illustrated in Figures 5 and 6, and may be longitudinally reciprocated to abrade the aforesaid top surface portion of a fish hook. As is clearly shown, the longitudinally extending rib members 40 are spaced substantial distances from the inside opposing surfaces of the vise blocks, said distances being approximately equal to the distance between the guide rod 35 and the abrading bar 32, whereby said abrading bar will be located over the fish hook 38 when said fish hook is clamped between the vise blocks and the abrading bar 32 is rotated to a position such as that shown in Figures 5 and 6.

The vise blocks 12 and 13 are further formed with registering transverse apertures 41 and 42, respectively, as is clearly shown in Figure 8, said apertures 41 and 42 being adapted to slidably receive the guide rod 35 of the abrading member 31, the apertures 41 and 42 being located so that the abrading bar 32 will be supported above the top surfaces of the vise blocks 12 and 13 in the manner illustrated in Figure 7, so that the abrading bar 32 may be transversely reciprocated relative to the vise blocks, whereby to engage with a surface portion of a fish hook 39 clamped between the forward portions of the vise blocks and supported against the upper guide pin 23 in the manner shown in Figure 7.

As will be readily apparent, a fish hook 38 may be clamped between the vise blocks in the manner illustrated in Figure 1 so that the hook portion 39 is supported above the top surfaces of the vise blocks, the shank portion of the hook being engaged in either one of the recesses 29 or 30, depending upon the direction of twist of the hook. The abrading member 31 may be mounted in the manner illustrated in Figure 1, whereby the file bar 32 may be rotated into engagement with a portion of the fish hook 39 to be abraded, the exact surface to be abraded being selected by engaging the guide rod 35 in a selected supporting aperture 37.

The fish hook may be clamped between the vise blocks 12 and 13 in a position such as that illustrated in Figures 5 and 6, wherein the portion to be abraded extends substantially parallel to the top surfaces of the vise blocks, the shank portion of the hook being located in one of the recesses 29 or 30, depending upon the direction of twist of the hook. The abrading member 31 may be arranged with the rod 35 engaged in one of the guide lugs 40 so that the abrading bar 32 may be rotated so as to overlie the portion of the fish hook 39 to be abraded, whereby the abrading member 31 may be reciprocated longitudinally to produce the desired sharpening effect on the fish hook.

As previously mentioned, as an alternative method of using the sharpener, the fish hook 38 may be clamped between the forward portions of the vise blocks in the manner illustrated in Figure 7, whereby the fish hook 39 projects upwardly above the top surfaces of the vise blocks, and whereby the abrading member 31 may be mounted for transverse movement with the file bar 32 engaging the surface to be abraded.

As will be readily understood, the sharpener above described may be made in relatively compact form so that it may be held in the hand easily and may be thus manipulated in any location in which the fisherman happens to be stationed. Furthermore, the sharpening device will accommodate hooks of various sizes, since it is readily adjustable to receive different sizes of hooks between the vise blocks 12 and 13.

While a specific embodiment of an improved fish hook sharpener has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fish hook sharpener, a pair of side by side vise blocks, a clamping screw extending rotatably through one of the blocks and threadedly engaged in the other block and being formed and arranged to at times exert clamping force urging the blocks together, whereby to clamp a fish hook therebetween, an abrading member, and means slidably supporting said abrading member for rectilinear movement relative to said blocks in a direction parallel to the abrading member, for rotation around an axis parallel to said abrading member, and in a position to abrade the point of a fish hook clamped between the blocks.

2. In a fish hook sharpener, a pair of side by side vise blocks, a clamping screw extending rotatably through one of the blocks and threadedly engaged in the other block and being formed and arranged to at times exert clamping force urging the blocks together, whereby to clamp a fish hook therebetween, an abrading bar, a supporting rod secured to said bar in parallel spaced relation thereto, and means on the blocks formed and arranged to slidably receive said rod and to slidably and rotatably support said abrading bar for rectilinear movement relative to said blocks in a direction parallel to the abrading member, for rotation around an axis parallel to said abrading member, and in a position to abrade the point of a fish hook clamped between the blocks.

3. In a fish hook sharpener, a pair of side by side vise blocks, a clamping screw extending rotatably through one of the blocks and threadedly engaged in the other block and being formed and arranged to at times exert clamping force urging the blocks together, whereby to clamp a fish hook therebetween, an abrading bar, and a supporting rod secured to said bar in parallel spaced relation thereto, said blocks being formed with guide apertures arranged to slidably and rotatably receive said rod and to slidably support said abrading bar for rectilinear movement relative to said blocks in a direction parallel to said abrading member and in a position to abrade the point of a fish hook clamped between the blocks.

4. In a fish hook sharpener, a pair of side by side vise blocks, a plurality of transversely extending guide pin elements rigidly secured to one of the blocks, the other block being formed with transverse guide bores slidably receiving said guide pin elements, a clamping screw extending rotatably through one of the blocks and threadedly engaged in the other block and being formed and arranged to at times exert clamping force urging the blocks together, whereby to clamp a fish hook therebetween, an abrading member, and means slidably supporting said abrading member for rectilinear movement relative to said blocks in a direction parallel to the brading member, for rotation around an axis parallel to said abrading member, and in a position to abrade the point of a fish hook clamped between the blocks.

5. In a fish hook sharpener, a pair of side by side vise blocks, a plurality of transversely extending guide pin elements rigidly secured to one of the blocks, the other block being formed with transverse guide bores slidably receiving said guide pin elements, a clamping screw extending rotatably through one of the blocks and threadedly engaged in the other block and being formed and arranged to at times exert clamping force urging the blocks together, whereby to clamp a fish hook therebetween, an abrading bar, and a supporting rod secured to said bar in parallel spaced relation thereto, said blocks being formed with guide apertures arranged to slidably and rotatably receive said rod and to slidably support said abrading bar for rectilinear movement relative to said blocks in a direction parallel to said abrading member and in a position to abrade the point of a fish hook clamped between the blocks.

References Cited in the file of this patent

UNITED STATES PATENTS

| Number | Name | Date |
|---|---|---|
| 214,907 | Grimmitt | Apr. 29, 1879 |
| 868,783 | Hogg | Oct. 22, 1907 |
| 966,036 | Mikesell | Aug. 2, 1910 |
| 1,476,265 | Matthews | Dec. 4, 1923 |
| 1,904,075 | Petrich | Apr. 18, 1933 |
| 2,061,842 | Louden | Nov. 24, 1936 |
| 2,452,696 | Stabler | Nov. 2, 1948 |
| 2,574,306 | Walker | Nov. 6, 1951 |